United States Patent
Schaeferling et al.

(10) Patent No.: US 8,821,216 B2
(45) Date of Patent: Sep. 2, 2014

(54) METHOD AND DEVICE FOR REMOVING A SECONDARY BURR ON AN END-CUT WORK PIECE WHEEL

(75) Inventors: Karl Schaeferling, Unterschleissheim (DE); Gerhard Reichert, Maisach (DE)

(73) Assignee: The Gleason Works, Rochester, NY (US)

( * ) Notice: Subject to any disclaimer, the term of this patent is extended or adjusted under 35 U.S.C. 154(b) by 836 days.

(21) Appl. No.: 12/759,025

(22) Filed: Apr. 13, 2010

(65) Prior Publication Data

US 2010/0273400 A1    Oct. 28, 2010

(30) Foreign Application Priority Data

Apr. 22, 2009    (DE) .......................... 10 2009 018 405

(51) Int. Cl.
*B24B 1/00* (2006.01)
(52) U.S. Cl.
USPC ............................................. 451/47; 451/58
(58) Field of Classification Search
USPC ........ 451/47, 458, 58, 56, 43, 44; 407/27, 29, 407/31
See application file for complete search history.

(56) References Cited

U.S. PATENT DOCUMENTS

| | | | | |
|---|---|---|---|---|
| 237,234 | A | * | 2/1881 | Beale .............................. 407/29 |
| 2,295,148 | A | * | 9/1942 | Witham .......................... 407/27 |
| 2,329,284 | A | * | 9/1943 | Mentley .......................... 407/27 |
| 2,916,971 | A | | 12/1959 | McNabb |
| 4,068,558 | A | * | 1/1978 | Loos .................................. 409/8 |
| 4,155,677 | A | | 5/1979 | Loos |
| 6,050,755 | A | | 4/2000 | Huber et al. |
| 6,676,337 | B2 | | 1/2004 | Daniek |
| 2002/0197118 | A1 | | 12/2002 | Daniek |

FOREIGN PATENT DOCUMENTS

| | | |
|---|---|---|
| DE | 2659108 A1 | 7/1978 |
| DE | 8328237 U1 | 7/1984 |
| DE | 3905168 C1 | 5/1990 |
| DE | 29715092 U1 | 10/1997 |
| DE | 10260423 A1 | 9/2003 |
| DE | 10309116 A1 | 9/2004 |
| EP | 1270127 A1 | 1/2003 |

OTHER PUBLICATIONS

Search Report from German Patent Office for priority application DE 102009018405.8.
English translation of Extended European Search Report for corresponding application EP 10002238.3.

* cited by examiner

*Primary Examiner* — Dung Van Nguyen
(74) *Attorney, Agent, or Firm* — Robert L. McDowell

(57) ABSTRACT

A method and a device for removing secondary burrs raised on the tooth flanks of a work piece wheel by a chamfering of the end tooth edges of said work piece wheel provides a tool wheel that rotationally meshes with the work piece wheel. Said tool wheel has cutting edges on its tooth flanks (5, 6) and their cutting motion, caused by the meshing, removes the secondary burrs by cutting.

10 Claims, 1 Drawing Sheet

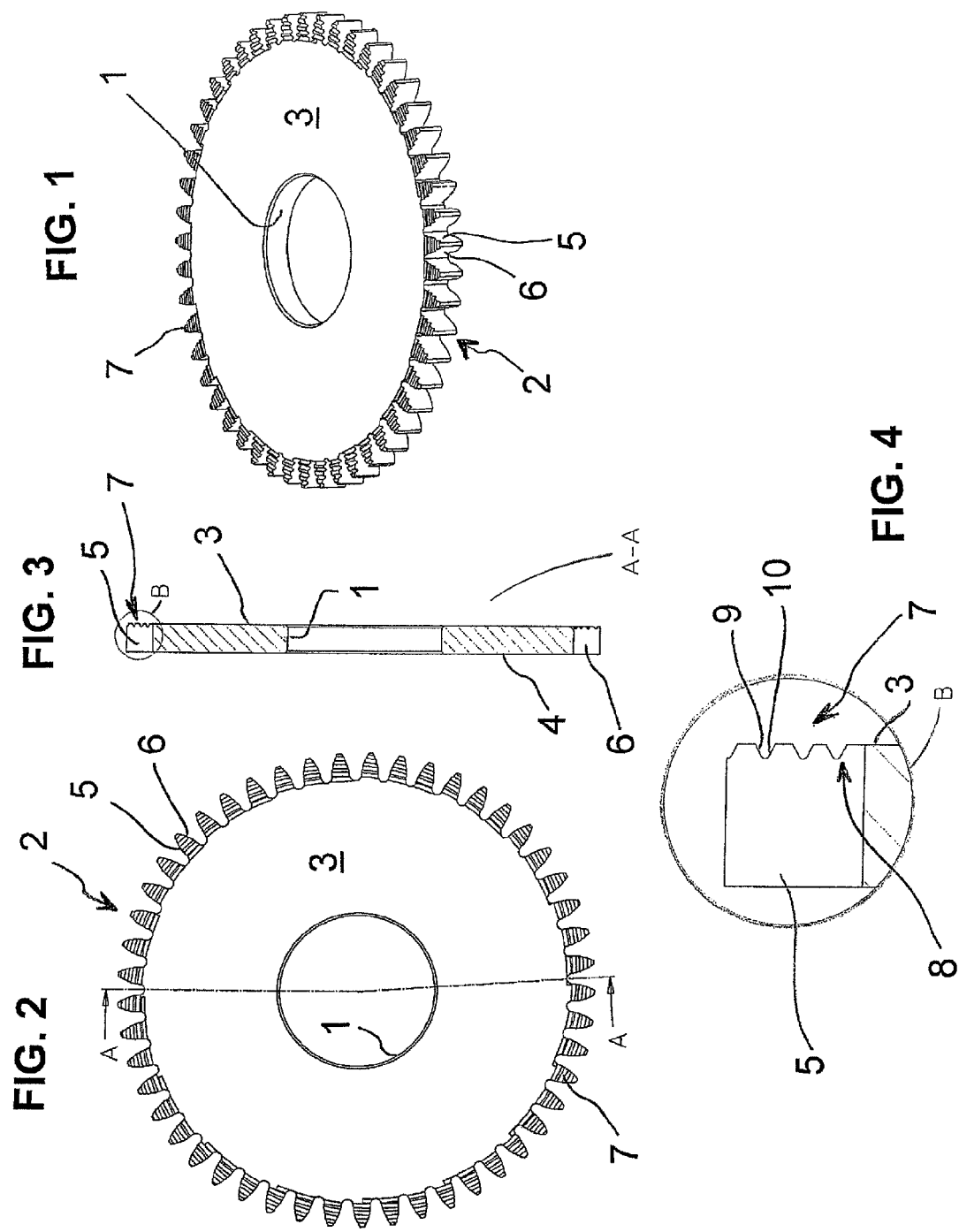

METHOD AND DEVICE FOR REMOVING A SECONDARY BURR ON AN END-CUT WORK PIECE WHEEL

This application claims the benefit of German Patent Application No. DE 10 2009 018 405.8 filed Apr. 22, 2009 the disclosure of which is hereby incorporated by reference.

FIELD OF THE INVENTION

The invention relates to a method for removing a secondary burr on a toothed work piece wheel, which was created in reworking an end tooth edge of a tooth into a chamfer that connects an end face and a tooth flank of the tooth in a peripheral zone of the tooth flank adjacent to the chamfer, with the tooth flanks of the work piece wheel meshing in rotation with the tooth flanks of a toothed tool wheel, as well as a device suitable for performing the method.

BACKGROUND OF THE INVENTION

The cutting of gears results in a burr on the end tooth edges, which must be removed for various reasons. One of the reasons is that in the subsequent work steps, an end face of the gear wheel is often used as a planar clamping and determination surface, and the burr interferes with the planarity of said surface. Furthermore, after hardening, the burr creates the risk of breaking off later, when the gearwheel runs in a transmission, thus causing damage to the tooth flanks or to components of the transmission. Furthermore, this type of burr also represents a risk of injury during the handling of the work piece wheels. It is also not sufficient to merely remove the burr because the remaining tooth edge can become glass-hard during hardening due to over-carburization, and then chip under stress.

Thus, in a known method described earlier (EP 1 270 127 A1), the tooth edge is reshaped into a chamfer in that material of the work piece wheel is displaced in the zone of the end tooth edge by a chamfering wheel meshing therewith. However, this plastic reshaping produces a secondary burr in the periphery of the tooth flank adjacent to the chamfer. Said secondary burr represents a severe problem for the subsequent hard machining, for example by honing or grinding. It leads to a premature wear and tear of the machining tool and therefore requires frequent truing processes of the machine tool used for the reworking. This is why the work piece wheel meshes with a toothed smoothing wheel in the aforementioned prior art to use second-stage pressure to smooth the secondary burr. However, this cannot achieve a completely satisfactory removal of the secondary burr.

The terms "toothed" and "toothing" used herein refer to any external or internal toothing where the meshing occurs in a rolling fashion. In particular, the toothing may be cylindrical or conical in shape.

The invention is based on the problem of providing a method and a device of the type described above, which allows an improved removal of the secondary burr.

SUMMARY OF THE INVENTION

In accordance with the invention, this problem is solved by a device and method with a cutting motion of a cutting edge formed on the tooth flank of the tool wheel, which is caused by the meshing and removes the secondary burr. This means that with the method in accordance with the invention, the secondary burrs are not smoothed with a smoothing roller by pressing, but rather removed by machining with the cutting motion of the cutting edge. The meshing between the work piece wheel and the tool wheel leads to a cutting motion essentially in the direction of the tooth depth over the peripheral zone of the tooth flank where the secondary burr was raised. Said cutting motion can occur in the direction from tooth tip toward tooth base or in the opposite direction. Furthermore, each tooth of the tool wheel can have such a cutting edge on its left flank as well as on its right flank. In that case, the secondary burrs are removed from the left and right flanks of successive teeth of the work piece wheel in direct succession.

Other characteristics, details and advantages of the invention follow from the description below, which explains the invention with reference to the illustration. The illustrations show:

BRIEF DESCRIPTION OF THE DRAWINGS

FIG. 1 illustrates a perspective view of an embodiment of an end-cut tool wheel.
FIG. 2 shows a face view of the tool wheel in FIG. 1.
FIG. 3 shows a section along the line A-A in FIG. 2.
FIG. 4 illustrates a section from FIG. 3 in enlarged representation.

DETAILED DESCRIPTION OF THE PREFERRED EMBODIMENT

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

As stated above, with the method in accordance with the invention, the secondary burrs are not smoothed with a smoothing roller by pressing, but rather removed by machining with the cutting motion of the cutting edge. The meshing between the work piece wheel and the tool wheel leads to a cutting motion essentially in the direction of the tooth depth over the peripheral zone of the tooth flank where the secondary burr was raised. Said cutting motion can occur in the direction from tooth tip toward tooth base or in the opposite direction. Furthermore, each tooth of the tool wheel can have such a cutting edge on its left flank as well as on its right flank. In that case, the secondary burrs are removed from the left and right flanks of successive teeth of the work piece wheel in direct succession.

The tooth edges can be reworked into their chamfers by reshaping or cutting; both cases result in the secondary burr. In one embodiment of the method in accordance with the invention, it is provided in the first case mentioned above that the reworking of the end tooth edge of the work piece wheel is performed by the plastic deformation of said tooth edge by means of a tooth of a toothed chamfering wheel meshing therewith. The helix angle of the zone of the teeth of the chamfering wheel that meshes with the work piece wheel corresponds to the work piece wheel chamfer to be generated.

With respect to the device, the object of the invention is attained with a device for removing a secondary burr on a toothed work piece wheel, which was created by the reworking of an end tooth edge of a tooth into a chamfer that connects an end face and a tooth flank of the tooth in a peripheral zone of the tooth flank adjacent to the chamfer, and a toothed tool wheel having tooth flanks that rotationally mesh with the tooth flanks of the work piece wheel, in that on a tooth flank of the tool wheel, a cutting edge running in the direction of the width of the tooth is developed in a zone of the tooth flank that meshes with the peripheral zone of the tooth flank of the work piece wheel.

In the device developed in accordance with the invention, the cutting edge moves essentially in the direction of the depth of the tooth over the peripheral zone of the tooth flank of the work piece wheel which has the secondary burr during the meshing and thus cuts off the secondary burr. Preferably, the left flank as well as the right flank of each tooth of the tool wheel has at least one such cutting edge, which because of said arrangement mesh successively with the left flanks and the right flanks of successive teeth of the work piece wheel in the cutting action.

Preferably, it is provided that the tooth flanks of the tool wheel are concave in the direction of the width of the tooth. Said concave shape ensures that the machining point of the tool wheel occurs only at the peripheral zones of the tooth flanks which have the secondary burrs, whereas the zones of the tooth flanks that extend from that point in the direction of the width of the tooth toward the center of the tooth do not come into contact with the tool wheel and thus are not subject to machining.

In the scope of the invention, it is in particular provided that the cutting edge is formed by a section of an edge of a recess of the tooth of the tool wheel wherein said edge is limited by the tooth flank, and said recess is open toward the tooth flank. In this way, the zone of the tooth flank adjacent to the section of the edge that forms the cutting edge represents the free surface, and the wall zone of the recess adjacent to said section represents the machining surface of the cutting edge.

Preferably, it is provided that the tooth flank of the tool wheel has a plurality of cutting edges that are spaced relative to one another in the direction of tooth depth. Said cutting edges can act on varying successive sections of the secondary burr in the direction of tooth depth during meshing. With an appropriate selection of the ratio between the number of teeth of the tool wheel and the number of teeth of the work piece wheel, it can be ensured that, in any case, after a sufficient number of rotations, there is a complete overlapping between the motion paths of said cutting edges and the secondary burr so that the latter is cut off completely.

An advantageous embodiment is furthermore characterized in that each recess is open toward its adjacent end face of the tooth of the tool wheel and runs from the left flank of the tooth to the right flank of the tooth. In this way, the recesses can be developed in a simple manner by removing material from the front face of the tool wheel. Its cross-sectional form in the sectional view, which is orthogonal relative to the transverse section, is not important as long as its form ensures the formation of the cutting edges to remove the secondary burrs.

In this context it has proven useful that the recesses are located in transverse section on a thread of a spiral. It can be provided that the spiral is multi-threaded. For example, the number of threads may be between 3 and 7. Alternately, the recesses in transverse section may be located on one or a plurality of arcs of a circle. In all of these cases, the tool used for their production is moved under axial advancement along an appropriate trajectory curve relative to the front surface of the tool wheel.

According to another aspect of the invention, it is provided that the tool wheel is non-rotatably connected to a coaxial toothed chamfering wheel and that the teeth of said chamfering wheel, which mesh with the tooth edges of the work piece wheel, have a helix angle that corresponds to the chamfer. Because of the rotation of the work piece wheel when meshing with said means, which combines the tool wheel and the chamfering wheel, the chamfering as well as the removal of secondary burrs is performed in one and the same process. In particular, it may be provided that the teeth of the chamfering wheel are provided only on a partial section of its circumference. Furthermore, it is sufficient if the teeth of the tool wheel have the cutting edges only on a partial section of its circumference that is different from the aforementioned partial section. In that case, an appropriate number of rotations and a suitable selection of the ratio between the number of teeth of the chamfering wheel and the number of teeth of the work piece wheel can also always ensure that the latter is provided with the chamfer on all of its teeth.

A spur cut tool wheel, which is shown in various views in the illustrations, has a coaxial cylindrical hub surface 1 relative to its axis of rotation to accommodate a shaft or arbor for its rotational mounting, a coaxial toothing with a plurality of teeth 2 relative to its axis of rotation as well as two orthogonal end faces 3, 4 relative to its axis of rotation, which run radially from the hub surface 1 to the addendum of the toothing. Each tooth 2 has a left tooth flank 5 and a right tooth flank 6, which are shown in FIGS. 3 and 4 in an orthogonal top view relative to the axis of rotation.

The end face 3 is completely planar in its zone running between the hub surface 1 and the root circle of the toothing. On the other hand, in the zone between the root circle and the addendum of the toothing, which forms the end faces of the teeth 2, the teeth 2 are provided with groove-like recesses 7. Said recesses 7 extend on each tooth 2, from the view in transverse section, from the left tooth flank 5 to the right tooth flank 6. In this way, the recesses 7 delimit an edge 8 on the respective tooth flanks 5, 6. The sections 9, 10 of said edge 8 extend in the direction of the width of the tooth and form a respective cutting edge. In doing so, the zones of the tooth flanks 5, 6 adjacent to the cutting edges 9, 10 represent the free surface associated with the cutting edge, and the wall zones of the recesses 7 adjacent to the cutting edges 9, 10 represent the associated machining surface.

The illustration furthermore shows that the recesses 7 of all teeth 2 are located on arc-shaped curve sections centered around the axis of rotation. In particular, they can be arc-shaped sections or threads of a spiral. In their orthogonal cross-section relative to the plane of transverse section, as is shown, for example, in FIG. 4, the form of the recesses 7 is largely random. The only requirement is that the edges 8 defined by the recesses 7 have at least one section 9, 10 that extends in the direction of the end face of the respective tooth 2 opposite to the end face 3.

The tool wheel shown in the illustrations is used for the machining of a spur cut work piece wheel (not shown) having end tooth edges that were reworked into a respective chamfer that connects the respective tooth flank with the end face of the tooth. Said reworking resulted in a respective secondary burr in the peripheral zone of the tooth flank adjacent to the chamfer. To that end, the tool wheel shown in the illustrations is rotationally meshed with the work piece wheel to be machined. The first axial position between the work piece wheel and the tool wheel is chosen such that the flank zones of the tool wheel which have the cutting edges 9, 10 mesh with the peripheral zones of the tooth flanks of the work piece wheel which have the secondary burrs. Thus, the cutting edges 9, 10 essentially run in a cutting motion along the direction of the depth of the tooth of the work piece wheel in a machining fashion over the secondary burrs of the work piece wheel, essentially removing the secondary burrs after a few rotations.

The tool wheel shown in the illustrations has the recesses 7, which form the cutting edges 9, 10, only on its one end face 3, whereas the other end face 4 is completely planar. To said planar end face 4, an additional tool wheel developed in accordance with the illustration can be connected with its said planar end face 4 in mirror-inverted arrangement. In that case, the secondary burrs raised in the two flank end zones of the work piece wheel teeth can be removed simultaneously. However, this requires that the sum of the axial thicknesses of the two connected tool wheels corresponds to the axial distance of the peripheral zones of the tooth flanks of the work piece wheel which have the secondary burrs. It goes without saying that the appropriate adaptation can be performed with spacing discs that are inserted between the facing end faces 4 of the two tool wheels. With appropriate axial dimensioning, this embodiment can also be developed in one piece by providing the recesses 7 on both end faces 3, 4.

Alternately, it is also possible to position two tool wheels developed in accordance with the illustration coaxially relative to one another with sufficient space for a two-sided removal of the secondary burrs such that their end faces 3 having the recesses 7 are facing one another.

Because the meshing of the flanks between the tool wheel and the work piece wheel is required and desired only in the peripheral zones of the tooth flanks that have the secondary burrs, the teeth 2 of the tool wheel can be developed such that their tooth thickness decreases in the direction of the width of the tooth toward the center of the tooth. This can be achieved, for example, in that the teeth 2 of the work piece wheel are ground hollow.

The toothing of the tool wheel shown in the illustrations is a spur toothing. It is suitable for the machining of spur toothed work piece wheels. For helical work piece wheels, the tool wheel is developed with an appropriate helix angle.

Furthermore, a coaxial chamfering wheel relative to the work piece wheel can be connected to the end faces 3 having the recesses 7. The design and function of said chamfering wheel corresponds to the deburring wheel disclosed in EP 1 270 127 A1. Said chamfering wheel (not shown) has teeth over all or part of its circumference and the helix angle of said teeth corresponds to the chamfer to be generated at the work piece wheel. Because of this combination of the tool wheel and the chamfering wheel that effects the reshaping of the tooth edges of the work piece wheel by meshing with the tooth edges, the chamfering of the tooth edges as well as the removal of the secondary burrs raised in the process can be achieved in one and the same working cycle.

LIST OF REFERENCE SYMBOLS

1 Hub surface
2 Teeth
3, 4 End faces
5, 6 Tooth flanks
7 Recesses
8 Edge
9, 10 Cutting edges While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Method for removing a secondary burr on a toothed work piece wheel which is created by the reworking of an end tooth edge of a tooth into a chamfer that connects an end face of the tooth and a tooth flank of the tooth, said secondary burr being located in a peripheral zone of the tooth flank adjacent to said chamfer, said method comprising:
    rotationally meshing tooth flanks of the work piece wheel with tooth flanks of a toothed tool wheel, wherein the secondary burr is removed from the peripheral zone of the tooth flanks of the work piece by the cutting motion of a cutting edge (9, 10) located on a tooth flank (5, 6) of the tool wheel, said cutting motion being created by the meshing of the peripheral zone of the tooth flanks of the work piece wheel with tooth flanks of the toothed tool wheel.

2. Device for removing a secondary burr on a toothed work piece wheel, said device comprising:
    a toothed tool wheel having tooth flanks (5, 6) capable of rotationally meshing with the tooth flanks of the work piece wheel and removing secondary burrs from said tooth flanks, wherein a cutting edge (9, 10) extending in the direction of the width of the tooth face is located on a tooth flank (5, 6) of the tool wheel in a zone of the flank that meshes with the peripheral zone of a tooth flank of the work piece wheel,
    wherein the cutting edge (9, 10) is formed by a section of an edge (8) of a recess (7) of the tooth (2) of the tool wheel, which is delimited by the tooth flank (5, 6) and open toward the tooth flank, said recess (7) being located in an end (3,4) of a tooth (2).

3. Device in accordance with claim 2 characterized in that the tooth flanks (5, 6) of the tool wheel are concave in the direction of the width of the tooth face.

4. Device in accordance with claim 2 characterized in that the tooth flank (5, 6) of the tool wheel has a plurality of cutting edges (9, 10) spaced in the direction of the depth of the teeth.

5. Device in accordance with claim 2 characterized in that each recess (7) is open toward the adjacent end (3) of the tooth (2) of the tool wheel and extends from the left flank (5) of the tooth (2) to its right flank (6).

6. Device in accordance with claim 5 characterized in that the recesses (7) are positioned transversely on a thread of a spiral.

7. Device in accordance with claim 6 characterized in that the spiral is multi-threaded.

8. Device in accordance with claim 5 characterized in that the toothing of a tool wheel is an external spur toothing delimited by two radial end faces (3, 4) of the tool wheel.

9. Device in accordance with claim 8 characterized in that the recesses (7) are provided on only one of the two end faces (3) and that the other end face (4) is planar.

10. Device in accordance with claim 8 characterized in that the recesses (7) are provided on both end faces (3, 4).

* * * * *